(12) United States Patent
Katata et al.

(10) Patent No.: US 6,714,591 B1
(45) Date of Patent: Mar. 30, 2004

(54) VIDEO IMAGE CODING DEVICE AND VIDEO IMAGE DECODING DEVICE

(75) Inventors: Hiroyuki Katata, Chiba (JP); Tomoko Aono, Chiba (JP); Hiroshi Kusao, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/555,453

(22) PCT Filed: Jan. 25, 1999

(86) PCT No.: PCT/JP99/00307

§ 371 (c)(1),
(2), (4) Date: May 31, 2000

(87) PCT Pub. No.: WO99/38330

PCT Pub. Date: Jul. 29, 1999

(30) Foreign Application Priority Data

Jan. 27, 1998 (JP) ............................................. 10-13760

(51) Int. Cl.[7] .............................. H04N 7/12; G06K 9/36

(52) U.S. Cl. ................ 375/240.08; 382/243; 348/399.1

(58) Field of Search ...................... 375/240.08, 240.09, 375/240.24, 240.14; 348/399.1, 397.1, 420.1; 382/242, 243, 268, 266, 256

(56) References Cited

U.S. PATENT DOCUMENTS

| | | | |
|---|---|---|---|
| 5,262,856 A | | 11/1993 | Lippman et al. |
| 5,608,458 A | * | 3/1997 | Chen et al. ............ 375/240.14 |
| 5,649,032 A | | 7/1997 | Burt et al. |
| 6,125,142 A | * | 9/2000 | Han ........................ 375/240.1 |
| 6,157,745 A | * | 12/2000 | Salembier ................... 382/236 |

(List continued on next page.)

FOREIGN PATENT DOCUMENTS

| | | |
|---|---|---|
| EP | 0 476 603 A2 | 3/1992 |
| EP | 0 634 872 A2 | 1/1995 |
| EP | 0 652 524 A1 | 5/1995 |
| EP | 0 731 608 A2 | 9/1996 |
| EP | 0 753 970 A2 | 1/1997 |

(List continued on next page.)

OTHER PUBLICATIONS

Ebrahimi, "MPEG–4 Video Verification Model: A Video Encoding/Decoding Algorithm Based on Content Representation", Signal Processing, Image Communication, Elsevier Science B.V., Amsterdam, NL, vol. 9, No. 4, May 1, 1997, pp. 367–384.

Supplemental European Search Report mailed Dec. 4, 2002.

Minoru Sakaefuji, Bun Chun Sen, Shin'ya Sumino., "Kaisou Hygoen to tajuu tenplate o mochita gazou fugouka", Denshi Jouhou Tsuushin Gakkai gijutsu Kenkyuu Houkoku, 1995, vol. 94, No. 549, pp. 99–106.

(List continued on next page.)

Primary Examiner—Gims Philippe
(74) Attorney, Agent, or Firm—Nixon & Vanderhye P.C.

(57) ABSTRACT

A moving picture coder has a first coding mode in which the entire picture is coded and a second coding mode in which a partial region of the picture is coded. Coding is so performed that the frame rate inside the partial region is higher than that outside the partial region. To perform such coding, the coder comprises a region selecting section (201) for selecting the partial region, a shape coding section (202) for coding is the shape of the partial region, a moving picture coding section (204) for coding only the values of the pixels inside the partial region according to the selected region, and a coding control section (205). A moving picture decoder decodes a picture in the second mode by superimposing decoded picture data of the partial region of the picture in the second mode on the decoded picture data of the entire picture in the first mode.

4 Claims, 10 Drawing Sheets

U.S. PATENT DOCUMENTS 6,249,613 B1 * 6/2001 Crinon et al. ................ 382/236
6,314,209 B1 * 11/2001 Kweon et al. ............... 382/243

FOREIGN PATENT DOCUMENTS

| JP | 1-228384 A | 9/1989 |
| JP | 4-129490 A | 4/1992 |
| JP | 6-133303 A | 5/1994 |
| JP | 8-251583 A | 9/1996 |
| JP | 8-317385 A | 11/1996 |
| JP | 9-9233 A | 1/1997 |
| JP | 9-65338 A | 3/1997 |

OTHER PUBLICATIONS

Shin'ya Sumio, Kenjirou Tsuda, Bun Chun Sen, Minoru Sakaefuji, "Toumeido Jouhou o ryouiki hyougen ni mochiita dougazou fugouka", Jouhou Shori Gakkai Kenkyuu Houkoku, Audio visual fukugou jouhou shori, 1995, 95–AVM–9, vol. 95, No. 64, 9–3 (pp. 17–24).

Okada et al., "A Study on Picture Quality Improvement Technique for Video Codec" Sharp Technical Report No. 60, 12/1994, pp. 25 to 30.

* cited by examiner

VIDEO IMAGE CODING DEVICE AND VIDEO IMAGE DECODING DEVICE

FIELD OF THE INVENTION

The present invention generally relates to the field of digital image processing and, more specifically, to a video image coding device for encoding digital image data with high efficiency and a video image decoding device for decoding coded data encoded by the video image coding device.

BACKGROUND OF THE INVENTION

A video image coding method represented by a video image coding system H.261 has been applied for coding video images for video conferences, video telephones and so on. FIG. 1(A) is a block diagram of an exemplary conventional video image coding device and FIG. 1(B) is a block diagram of an exemplary conventional video image decoding device.

In FIG. 1(A), the video image coding device comprises a differencing portion 101, a coding portion 102, an adder 103, a frame memory 104 and a motion-compensated predicting portion 105. In FIG. 1(B), the video image decoding device comprises a decoding portion 106, an adder 107, a frame memory 108 and a motion-compensated predicting portion 109.

An original image is divided into plural blocks, each of which is input to the differencing portion 101 that in turn determines difference data between each block image data and predicted image data input from the motion-compensated predicting portion 105. The predicted image data can be obtained by the motion-compensated prediction from decoded image data that is already encoded and stored in the frame memory 104. At this time, the motion between the decoded image data and the original image data is detected on a block-by-block basis and detected motion data (not shown) is encoded by the coding portion 102. The coding portion 102 also encodes difference data calculated by the differencing portion 101, outputs the coded data and decodes the coded difference data. The decoded difference data is added by the adder 103 to the predicted image data, and then the resultant data is stored in the frame memory 104. The stored decoded data is used for motion-compensated prediction of a subsequent frame.

The decoding portion 106 decodes the coded data to obtain difference data and motion data (not shown). The decoded difference data is added by the adder 107 to the prediction image data and the resultant data is stored in the frame memory 108. The motion-compensated predicting portion 109 generates a predicted image data based on decoded image data stored in the frame memory 108 and the motion data.

Thus, the video images are encoded and decoded as mentioned above.

As the conventional video telephones and video conferencing facilities are usually used indoors, a background image behind a speaking person is generally a still picture. However, with a video telephone using outdoors, a background picture may temporally vary much more than the person's figure. Even in case of using video telephone indoors, its background image may considerably vary due to movement of a camera or/and with another person passing behind the speaking person. This produces information on the motion of the background image.

In such cases, the conventional technique requires increasing of a total of bits for encoding an entire sequence because of a larger amount of the background information to be encoded under the condition of maintaining a desired frame rate (the number of frames per second). As a result, we have one problem that the transmission capacity of a channel may be exceeded. On the other hand, it is necessary to reduce the frame rate in order to decrease the number of bits for encoding under the condition of maintaining the desired frame image quality. This is also a problem.

To solve the above-mentioned problem, Japanese Laid-Open Patent Publication No. 9-9233 discloses a technique for updating a partial region of each input image by controlling an input image through a video camera. This technique has, however, such a problem that because of appropriating a partial region merely by rectangles, non-continuity of an image occurs around the rectangular region boundary, resulting in considerable deterioration of the decoded image quality.

What is desired, therefore, is a video image coding device and decoding device that are free from the above-described drawbacks of the prior arts and can maintain both desirable frame rate and image quality of the objective (human facial) image without deterioration of the quality of the video image.

SUMMARY OF THE INVENTION

Accordingly, an object of the present invention is to provide a video image coding device having a first coding mode for encoding an image within a first region and a second coding mode for encoding an image within a second region being a part of the first region, which comprises a region selecting portion for selecting the first region and the second region, a shape coding portion for encoding the shapes of the first and second regions, a video image coding portion for encoding only the values of pixels inside the selected region according to the output of the shape coding portion and a coding data integrating portion for integrating the outputs of the shape coding portion and the video image coding portion.

Another object of the present invention is to provide a video image coding device having a first coding mode for encoding an image within a first region covering an entire input image and a second coding mode for encoding an image within a second region being a part of the first region, which comprises a region selecting portion for selecting a second region, a shape coding portion for encoding the shape of the second region, a video image coding portion for encoding the values of pixels of the entire image or only pixels inside the second region according to the output of the shape coding portion and a coding data integrating portion for integrating the outputs of the shape coding portion and the video image coding portion.

Another object of the present invention is to provide a video image coding device having a first coding mode for encoding an image within a first region and a second coding mode for encoding an image within a second region being a part of the first region, which comprises a region selecting portion for selecting a first region and a second region and a video image coding portion for encoding, as an ineffective block, a block outside the selected region according to the output of the region selecting portion and also for encoding the information indicative of an ineffective (inert) block and an effective (active) block.

Another object of the present invention is to provide a video image coding device having a first coding mode for encoding an image within a first region covering an entire input image and a second coding mode for encoding an image within a second region being a part of the first region, which comprises a region selecting portion for selecting a second region and a video image coding portion for encoding, as an ineffective block, a block outside the selected region according to the output of the region selecting portion and also for encoding information indicative of an ineffective block/an effective block.

Another object of the present invention is to provide a video image coding device characterized in that in said video image coding portion, coded data is provided with additional information indicating whether a partial region image data coded in the second coding mode is overlapped with an image encoded in the first coding mode.

A further object of the present invention is to provide a video image decoding device having a first decoding mode for decoding an image within a first region and a second decoding mode for decoding an image within a second region being a partial region within first region, which comprises a shape decoding portion for decoding the coded data of the shapes of the first and second regions included in input coded image, a video image decoding portion for decoding only the values of pixels inside the first region in the first decoding mode and only the values of pixels inside the second region in the second decoding mode and an image data overlapping portion for overlapping each other image data decoded in the video image decoding portion.

Another object of the present invention is to provide a video image decoding device having a first decoding mode for decoding a first region covering an entire input image and a second decoding mode for decoding an image within a second region being a partial region within the first region, which comprises a shape decoding portion for decoding coded data of the shape of the second region included in input coded data, a video image decoding portion for decoding the values of pixels of the entire image in the first decoding mode and only the values of pixels inside the second region in the second decoding mode and an overlapping portion for overlapping with each other image data decoded in said video image decoding portion.

Another object of the present invention is to provide a video image decoding device having a first decoding mode for decoding an image within a first region and a second decoding mode for decoding an image within a second region being a partial region within the first region, which comprises a video image decoding portion for decoding only the values of pixels inside the first region in the first decoding mode and only the values of pixels inside the second region in the second decoding mode according to ineffective/effective block information included in input coded data as information of whether the data being inside the first region or the second region and an overlapping portion for overlapping with each other image data decoded in said video image decoding portion.

Another object of the present invention is to provide a video image decoding device having a first decoding mode for decoding an image in a first region covering an entire image and a second decoding mode for decoding an image within a second region being a partial region within the first region, which comprises a video image decoding portion for decoding the values of pixels of the entire image in the first decoding mode and only the values of pixels inside the second region in the second decoding mode according to ineffective/effective block information included in the input coded data as information indicative of whether data being inside the first region or the second region and an overlapping portion for overlapping with each other image data decoded in said video decoding portion.

Another object of the present invention is to provide a video image decoding device characterized in that in said overlapping portion, image data decoded in the second decoding mode is overlapped with the image data decoded in the first decoding mode or another image data based upon information indicating whether a partial regional image data coded in the second coding mode is overlapped with an image coded in the first coding mode.

DETAILED DESCRIPTION OF THE PREFERRED EMBODIMENT

A video coding device according to the present invention has a first coding mode in which an entire image is encoded and a second coding mode in which only a partial area (e.g., a speaking person area or a facial portion) in the image is encoded. This may avoid increasing an amount of information to be encoded from a background image behind a speaking person or an object by reducing a frame rate in coding the background even if the background image may considerably change.

Figure 2:
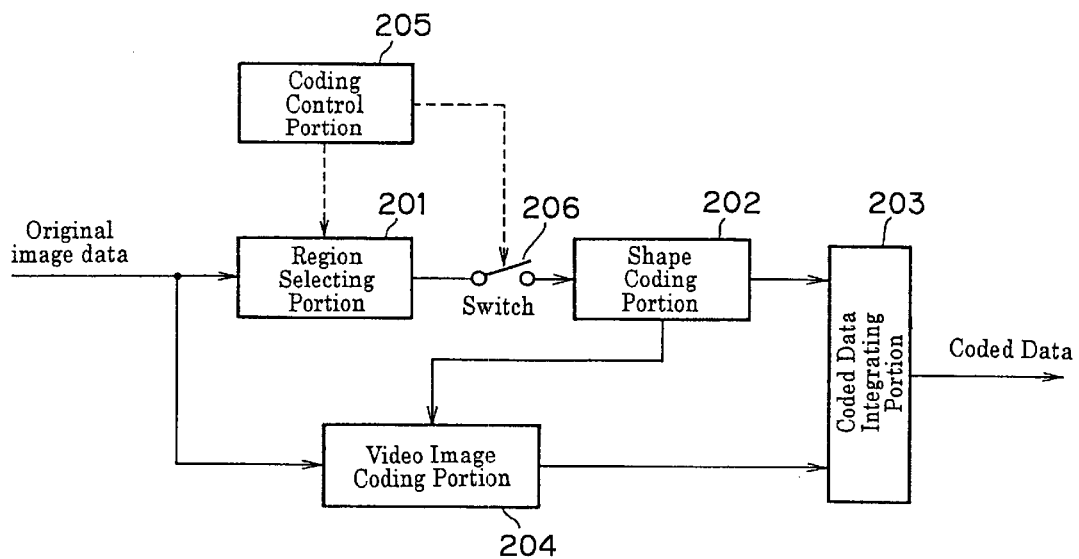
FIG. 2 is a block diagram of a video image coding device according to a first aspect of the present invention.

FIG. 2 is a block diagram of a video image coding device (hereinafter referred to as a coding device) according to a first embodiment of the present invention. As shown in FIG. 2, the coding device comprises a region selecting portion 201, a shape coding portion 202, a coded data integrating portion 203, a video image coding portion 204, a coding control portion 205 and a switch 206.

The operation of the coding device according to the first embodiment will be described in detail below with reference to FIG. 2.

The region selecting portion 201 extracts a region of a speaking person from an original image data when coding a partial image in the second coding mode. A facial portion extracting method was described in a paper entitled "A Study on Picture Quality Improvement Technique for Video Codec" (Sharp Technical Report, No. 6, pp. 25–30, December, 1994). In the first coding mode, the region selecting portion 201 outputs an entire image as a selected region.

Data of an original image data is encoded by the video image coding portion 204 in the first coding mode or the second coding mode. In the first coding mode, the video image coding portion 204 encodes an entire image. Coding is performed for example by using a video coding method H.261 described before in the background of the invention. In the second coding mode, the video image coding portion encodes only a partial region within an image according to the selection made by the region selecting portion. In this instance, coding is performed in the same manner as the coding in the first coding mode but it is restricted to a selected objective area. For example, when an original image is decomposed into blocks and encoded in the first coding mode, the original image is also decomposed into blocks in the second coding mode and only blocks containing a desired region is selected and encoded in the second coding mode.

The shape coding portion 202 encodes data of the shape of the region selected by the region selecting portion 201. The shape data is binary image data whose value, for example, is 1 for pixel within the selected region or 0 for pixel outside the selected region. The shape data may be encoded by applying any of International Standards MH, MR, MMR and JBIG for encoding binary images. The shape data coded and decoded by the shape coding portion 202 is input to the video image coding portion 204.

The coding control portion 205 controls the region selecting portion 201 and the switch 206 according to the selected coding mode. In the first coding mode, the control portion 205 controls the region selecting portion 201 to select an entire image and causes the switch 206 to open not to encode the shape data. In the second coding mode, the control portion 205 controls the region selecting portion 201 to select a partial region within the image and closes the switch 202 to perform the coding of a desired shape in the selected region.

Thus coded video image data and shape data are integrated together and then output by the coded data integrating portion.

A video image decoding device (hereinafter referred to as a decoding device) according to an aspect of the present invention will be described below.

Figure 3:
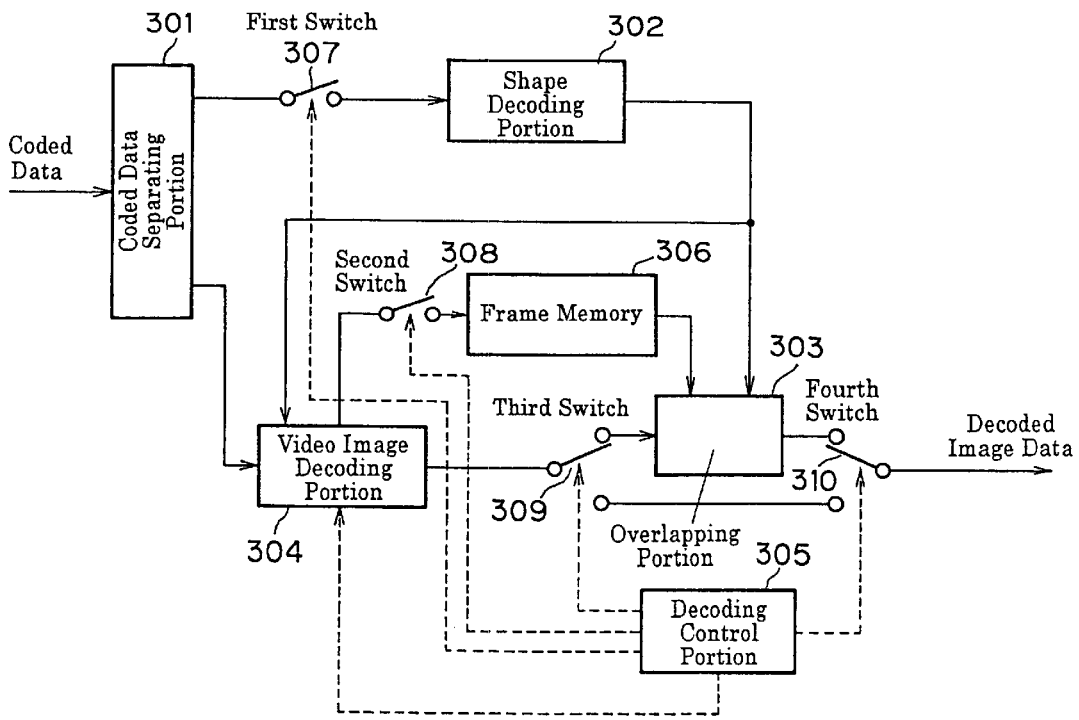
FIG. 3 is a block diagram of a video image decoding device according to a first aspect of the present invention.

FIG. 3 is a block diagram of a decoding device that is a first embodiment of the present invention. As shown in FIG. 3, the decoding device comprises a coded data separating (splitting) portion 301, a shape decoding portion 302, overlapping portion 303, a video image decoding portion 304, a decoding control portion 305, a frame memory 306, a first switch 307, a second switch 308, a third switch 309 and a fourth switch 310.

Referring to FIG. 3, the operation of the decoding device will be described in detail below.

The coded data separating portion 301 splits the input coded data into coded video image data and coded shape data. The coded shape data is decoded by the shape decoding portion 302 and restored as a binary image.

The video image decoding portion 304 decodes an entire image in the first coding mode and decodes only a partial region within an image in the second coding mode according to the decoded shape data. For example, when an original image is decomposed into blocks and decoded in the first decoding mode, the block including the region indicated by the shape data is decoded in the second coding mode.

The video image control portion 305 controls the first, second, third and fourth switches 307–310 according to the selected coding mode. Namely, in the first coding mode, the control portion 305 opens the first switch 307 not to decode the shape data, closes the second switch 308 to store decoded image data in the frame memory 306 and connects the third switch 309 and the fourth switch 310 to the lower-side contacts to directly output the decoded image data. In the second coding mode, the control portion 305 closes the first switch 307 to decode the shape data, opens the second switch 308 not to update the image data in the frame memory 306 and connects the third switch 309 and the fourth switch 310 to the upper-side contacts to input the decoded image data to the overlapping portion.

The overlapping portion 303 receives the decoded image data through the third switch 309 and overlaps the received decoded image data on the image data stored in the frame memory 306 with reference to the shape data. Namely, with the shape data having the value 1 indicating the data being inside the selected region, the decoded image data received through the third switch 309 is output. With the shape data having the value 0 indicating the data being outside the selected region, the image data stored in the frame memory 306 is output. In the second coding mode, the partial regional image data decoded in the second coding mode is overlapped with the decoded entire image data stored in the frame memory 306, thus generating overlapped image data.

Figure 7:
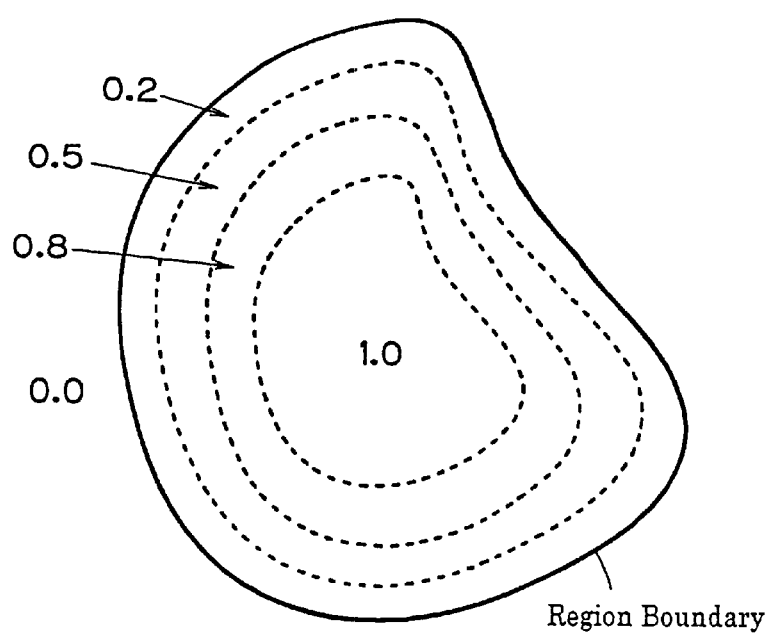
FIG. 7 shows an exemplary technique for preparing weighted image data according to the present invention.

In the overlapping portion 303, it is also possible to determine, instead of the above overlapping operation, a weighted mean of the data in the frame memory 306 and the data in the video image decoding portion 304. In this instance, a weight for determining a weighted mean for each pixel is obtained according to the shape data as follows:

There are two kinds of techniques. The first technique is to determine weight values in succession from the boundary of the region indicated by the shape data as shown in FIG. 7. A weight of 0 is first given to every pixel out of the region boundary, a weight of 0.2 is then given to a region boundary pixel. Boundary pixels of the part whose weight values is not determined within the region is decided. A weight of 0.5 is given to this corresponding regional pixel. Weighting is repeated for remaining pixels within the region until a weight of 1.0 is given to a final inside pixel. Weight data is thus prepared, which values are 1.0 at the center, 0.2 at the boundary and 0.0 on the outside of the boundary of the selected region.

The second technique is such that a weight value is 0 for every pixel out of the region and 1 for pixels within the region to form a binary image that is then filtered so that its boundary is gradated. This technique can prepare various kinds of weighting data by adjusting a filter size, filter coefficients and the number of filtrations. By setting a weight value 0 for each pixel on the outside of the region, 0 to 1 for pixels at the boundary of the region and 1 for pixels inside the region, noise can be prevented from occurring when overlapping images one on the other using binary shape data.

Thus, a partial region (speaking person's region) in an image can be encoded in any of the first and second coding modes while the other region (background) is encoded only in the first coding mode. This allows a frame rate of decoded image data for speaking person's region to be greater than that for background region.

The second embodiment of the invention is now described, which can display a part image overlapped with an original background image previously prepared by the user. The part image is extracted from a partial region of an image such as a speaking person or an object and encoded in the second coding mode. The part image can be overlapped with either a decoded image data as described for the first embodiment or the originally prepared background data. The coded part image is provided with a flag having, e.g., a value 1 for indicating the part image data to be overlapped with the background image data decoded in the first coding mode, and a flag having a value 0 for indicating the part image data to be overlapped with the original background image prepared by the decoding device.

Figure 4:
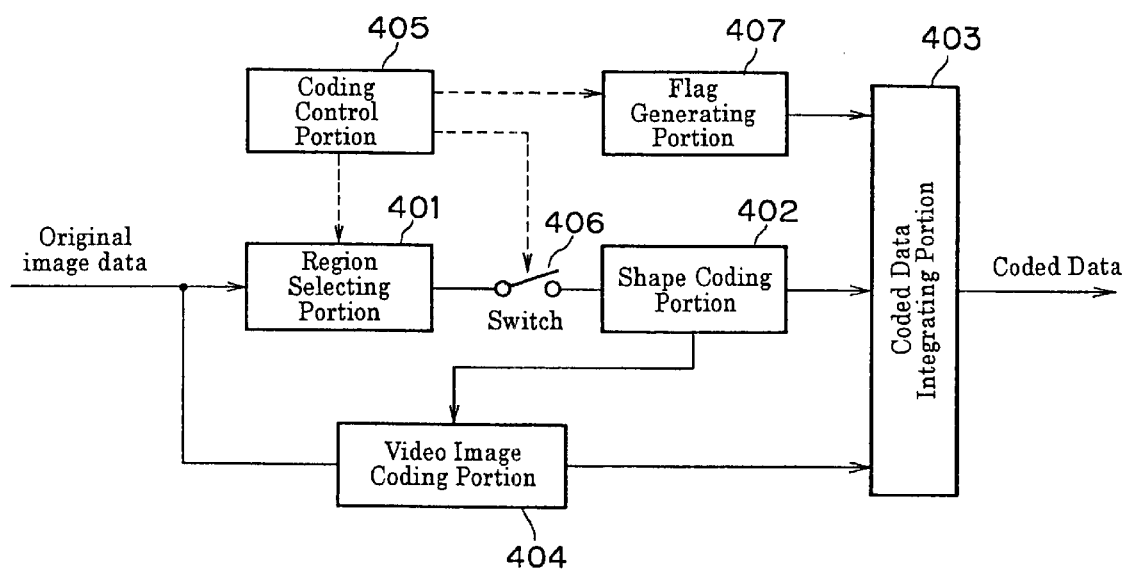
FIG. 4 is a block diagram of a video image coding device according to a second aspect of the present invention.

FIG. 4 is a block diagram for explaining a coding device that is the second embodiment of the present invention. This coding device has a flag generating portion 407 in addition to the construction of the coding device according to the first embodiment shown in FIG. 2. All other components except for a coding control portion 405 and a coded data integrating portion 403 are similar in function to those described for the first embodiment.

In FIG. 4, the flag generating portion 407 generates a flag having a value 1 or 0. The generated flag is added to the other relevant coded data by the coded data integrating portion 403. The flag may be generated for every frame coded in the second coding mode or only for a frame for which the first coding mode is switched over to the second coding mode. In the former case, a background image is changed over to another on frame-by-frame basis. In the latter case, a background image may be changed over to another only when the coding mode is changed to the second coding mode. Alternatively, a flag may be generated only at the beginning of coding an image sequence and added to a header of the coded data. In this case, the background image may be changed to another on a sequence-by-sequence basis.

Figure 5:
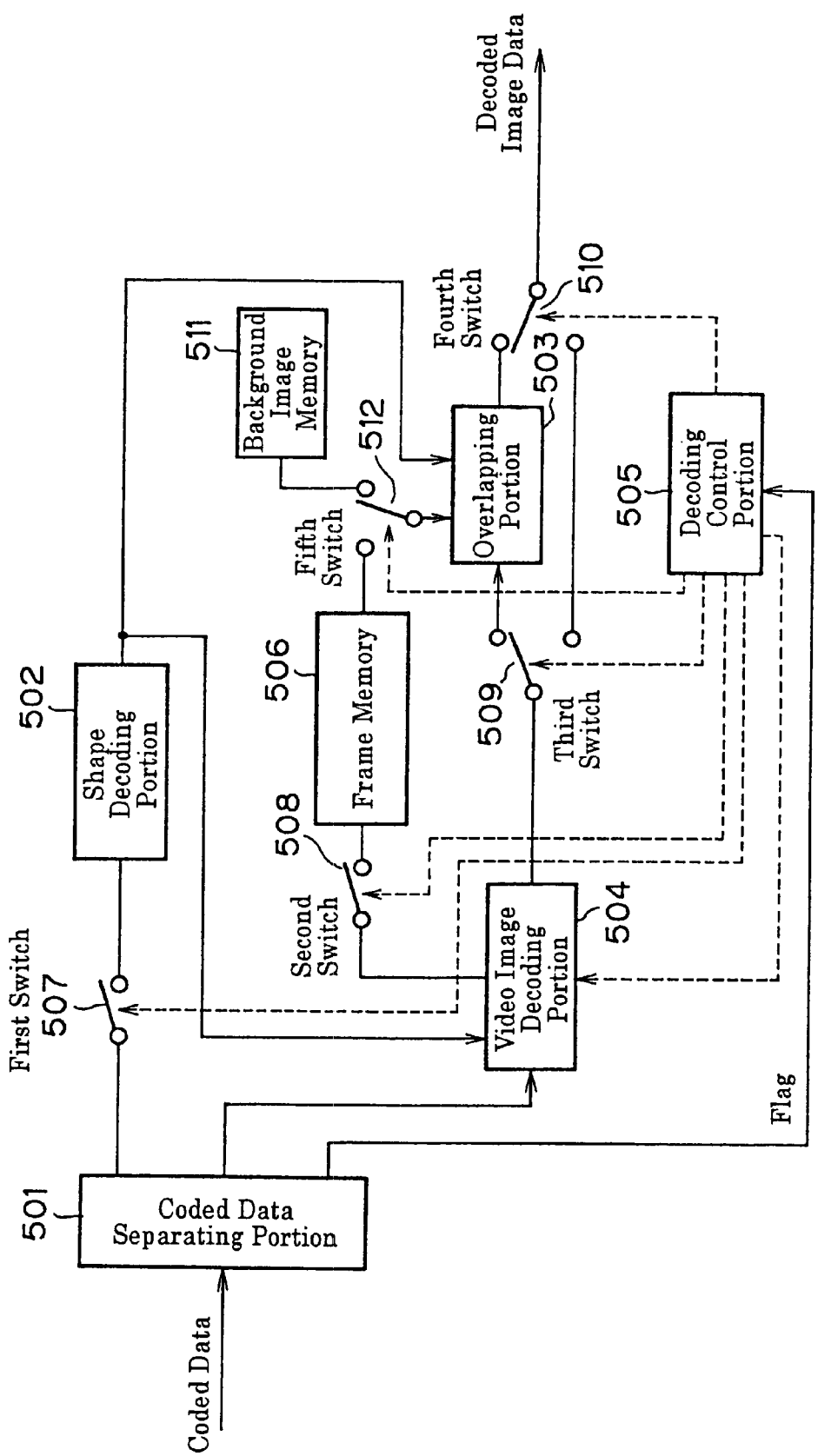
FIG. 5 is a block diagram of a video image decoding device according to a second aspect of the present invention.

FIG. 5 is a block diagram of a decoding device according to the second embodiment of the present invention. This decoding device has a background image memory 511 and a fifth switch 512 in addition to the construction of the decoding device (the first embodiment) of FIG. 3. The other components of this embodiment excepting a coded data separating portion 501 and decoding control portion 505 are similar in function to those described for the first embodiment.

In FIG. 5, the coded data separating portion 501 separates coded video image data, coded shape data and flags from input coded data. The flags are input to the decoding control portion 505.

The background image memory 511 stores therein background image data originally prepared by the user. The background image data may be image data previously coded in the first coding mode and sent from the coding device or image data specially picked up through a digital camera or read-in by a scanner.

In the similar way as described for the first embodiment, the decoding control portion 505 of the second embodiment controls a first switch 507, second switch 508, third switch 509 and fourth switch 510, and further controls a fifth switch 512 according to a flag value. Namely, with the flag indicating 1, the control portion 505 turns the fifth switch 512 to connect with the frame memory 506. With the flag indicating 0, the control 505 turns the fifth switch 512 to connect with the background image memory 511.

In the above embodiment, a frame memory for recording image data is used as the background image memory 511. It is also possible to use, instead of the above frame memory, a memory for recording single pixel data. That means, in the case that a flag has a value 0, a background image is painted over by data recorded in single pixel data.

A third embodiment of the present invention will be described below, which, in comparison with the first embodiment, is further simplified to dispense with encoding the shape of a selected region.

Figure 8:
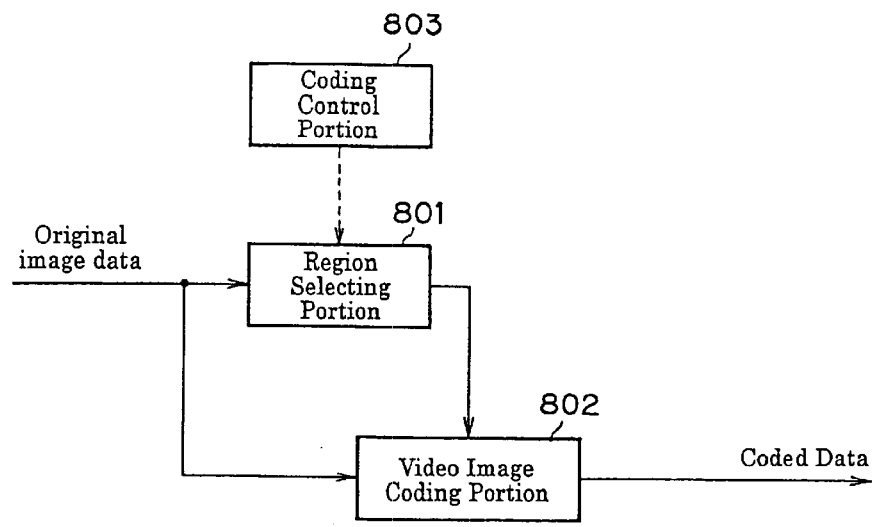
FIG. 8 is a block diagram of a video image coding device according to a third aspect of the present invention.

The coding device according to the third embodiment of the present invention is constructed as shown in FIG. 8, which is realized by removing, from the structure of the first embodiment of FIG. 2, the shape coding portion 202, the switch 206 and the coded data integrating portion 203. Referring to FIG. 8, the operation of the coding device according to the third embodiment is described below.

Figure 1:
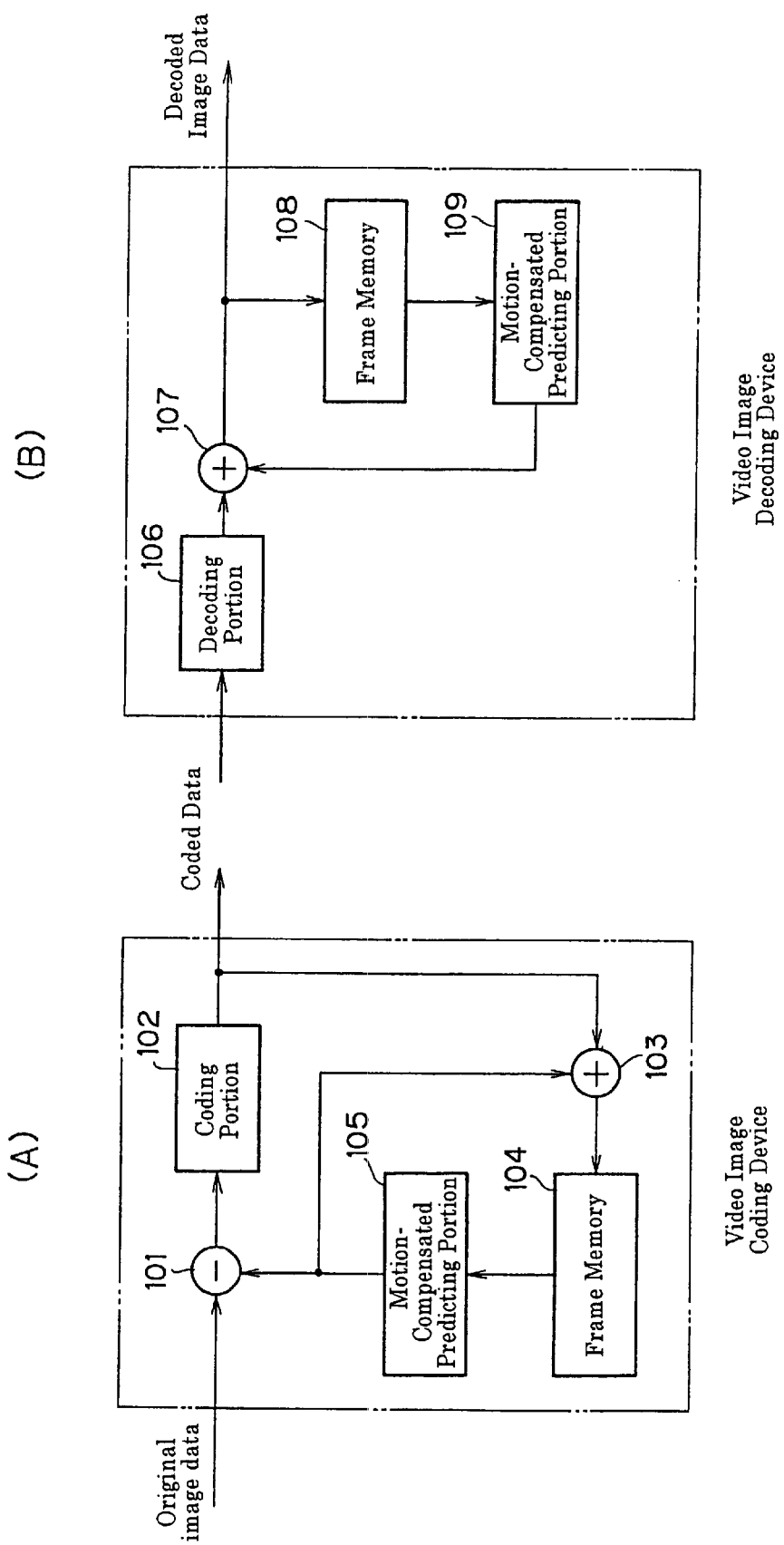
FIG. 1 illustrates exemplary conventional video image coding device and video image decoding device.

The video image coding portion 802 decomposes an input image into blocks and prediction-encodes the image on a block-by-block basis by applying the motion-compensated prediction coding method as described before in the paragraph "Background of the Invention". This embodiment differs from the first embodiment by the fact that all blocks other than those contained within a selected region by the region selecting portion 801 are encoded as ineffective (insignificant) blocks when encoding blocks in the second coding mode. The ineffective blocks are defined as blocks that do not contain differential data or motion data to be encoded by the coding portion 102 shown in FIG. 1. On the contrary, effective (significant) blocks are normal blocks that contain differential data or motion data. The effective block and the ineffective block are distinguished from each other by a single-bit data attached to each block.

Figure 6:
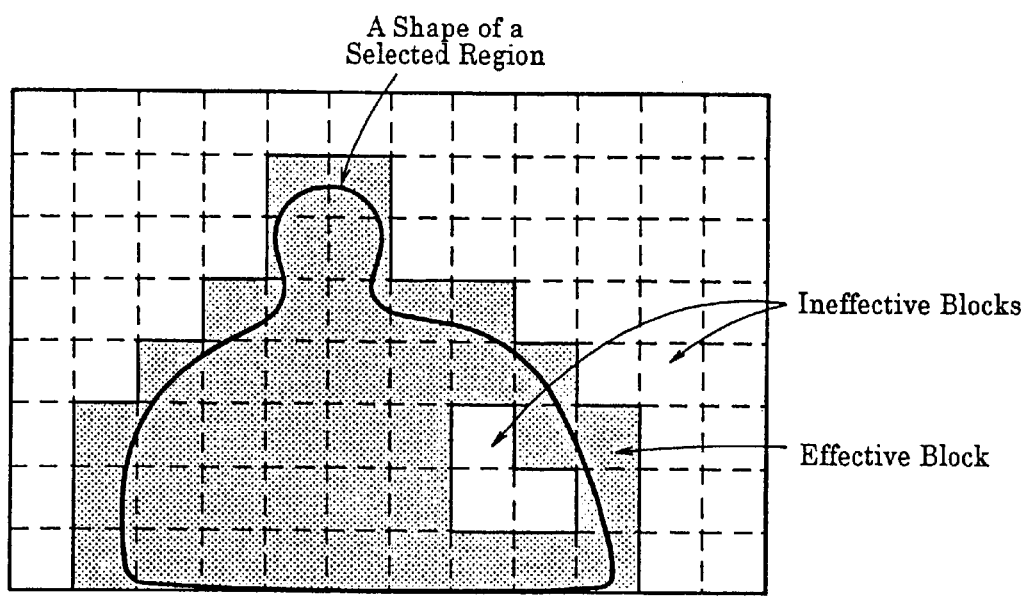
FIG. 6 is a view for explaining shapes of selected regions and ineffective and effective blocks defined according to the present invention.

FIG. 6 illustrates an exemplary image whose blocks are effective and ineffective in relation to a selected region. The blocks out of the selected region are always ineffective. However, it is noted that the selected region may also contain ineffective blocks and effective blocks. Although these blocks exist within the selected region, they have no change from a preceding coded image. Therefore, they are defined as insignificant blocks unnecessary for prediction coding.

Figure 9:
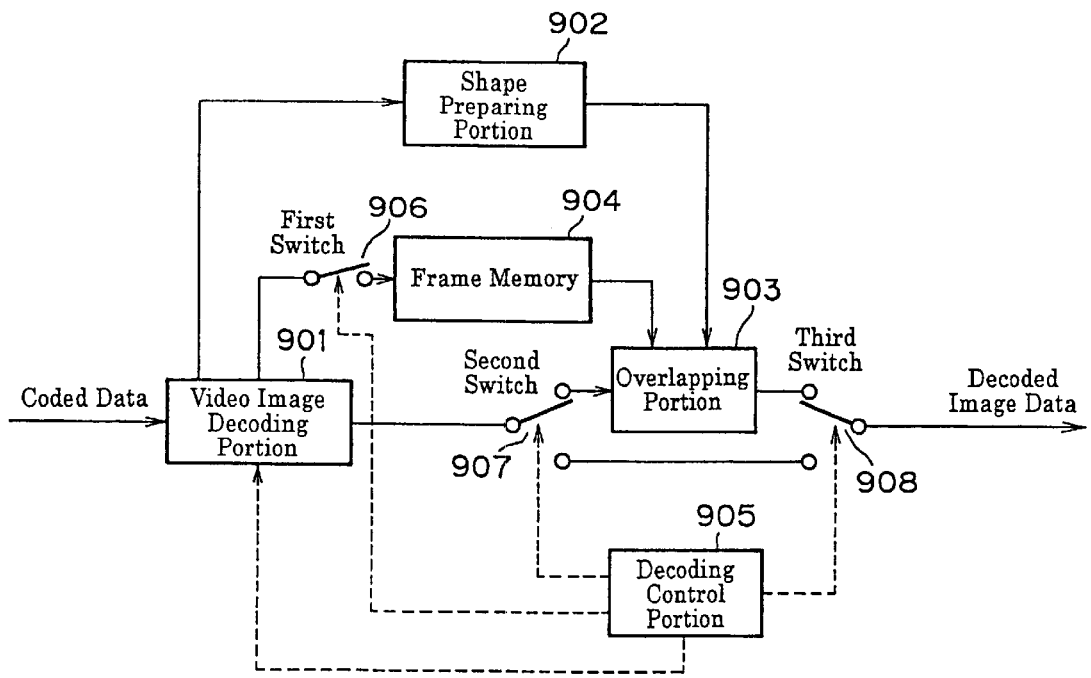
FIG. 9 is a block diagram of a video image decoding device according to a third aspect of the present invention.

The decoding device according to the third embodiment of the present invention has a structure shown in FIG. 9, which is realized by removing the signal line from the coded data separating portion 301 to the shape decoding portion 302 and the first switch 307 from the structure of the first embodiment shown in FIG. 3. Referring to FIG. 9, the operation of the decoding device according to the third embodiment is described as follows:

This decoding device differs from the first embodiment by the fact that a shape preparing portion 902 prepares shape data from single-bit data identifying ineffective/effective blocks, which are contained in coded data. Namely, the shape data for every ineffective block is given a value 0 and shape data for every effective block is given a value 1. The shape data thus prepared represents a region boundary at an accuracy such as a block size, causing a significant noise by overlapping a part image on a background image. Therefore, an overlapping portion 903 modifies the shape data for a selected region in such a way that the region boundary may have values 0 to 1 enabling preparation of decoded image data by applying the weighted mean values as described for the first embodiment.

Figure 10:
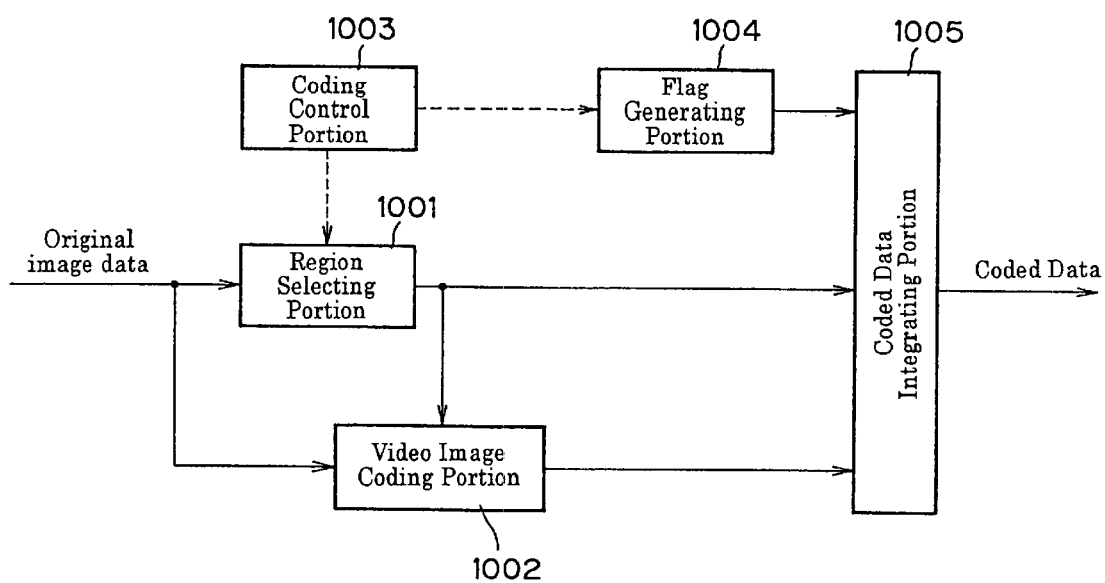
FIG. 10 is a block diagram of a video image coding device according to a fourth aspect of the present invention.
Figure 11:
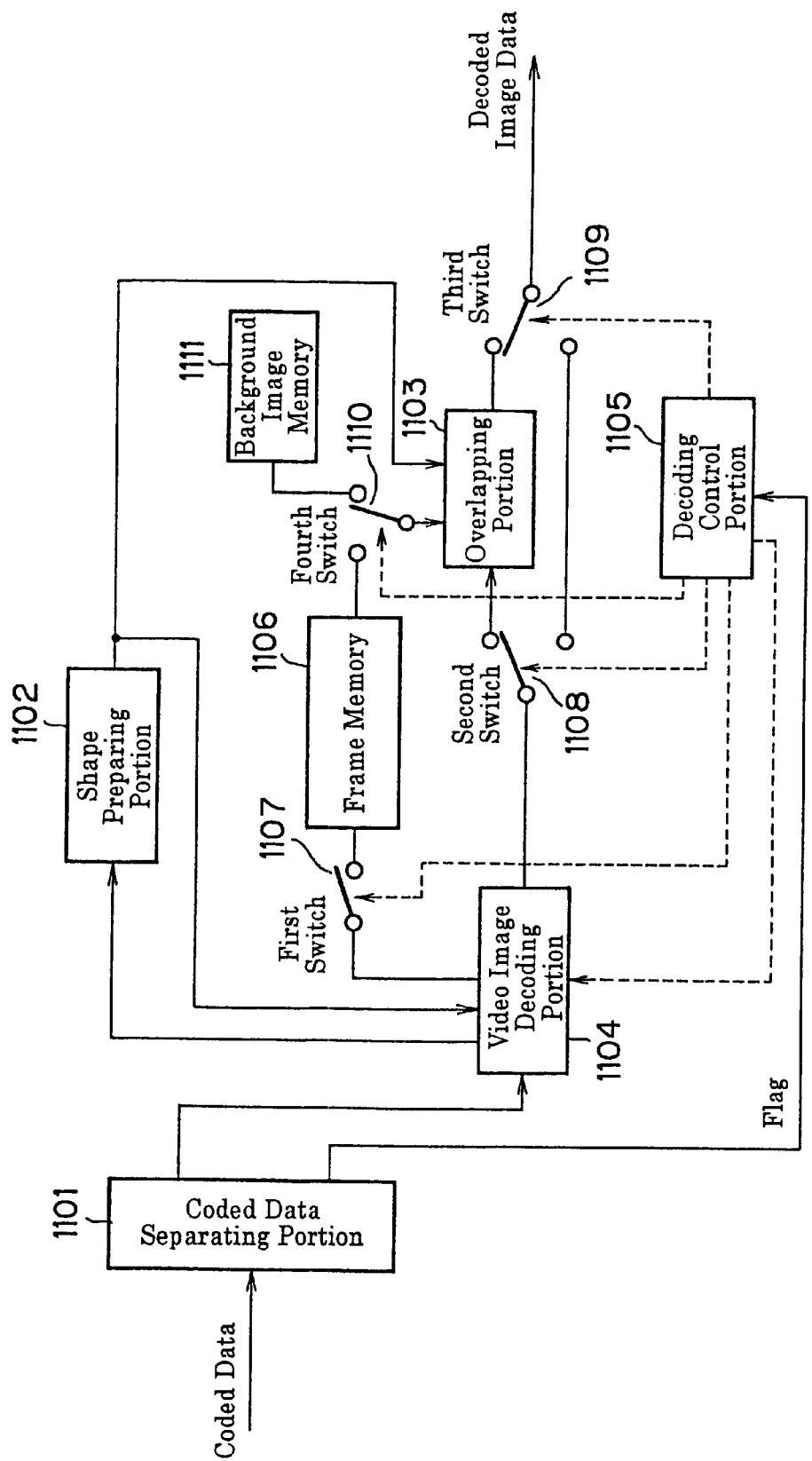
FIG. 11 is a block diagram of a video image decoding device according to a fourth aspect of the present invention.

Thus, the decoding device can produce a high-quality decoded image from an input image encoded by the coding device simplified by omitting the process of encoding the shape of a selected region. The same technique may also be applied to the coding and decoding device of the second embodiment. Namely, a coding device of FIG. 10 is realized by omitting the switch 406 and the shape coding portion 402 from the coding device of FIG. 4. Similarly, a decoding device of FIG. 11 is realized by omitting the signal line from the coded data separating portion 501 to the shape decoding portion 502 and the first switch 507 from the decoding device of FIG. 5.

In this instance, image data decoded in the second coding mode may be overlapped with a background image specially prepared by the user. The operation of the video image coding portion 1002 of FIG. 10 is as follows:

With a flag "0" output from a flag generating portion 1004, the video image coding portion 1002 encodes all blocks within a selected region as effective blocks. For example, in FIG. 6, blocks within the selected region are all encoded as effective blocks. The operation of the coding device except for the above is the same as described for the second embodiment. The decoding device of FIG. 11 can thus obtain a high-quality decoded image even in the case when an overlapping portion 1103 uses image data from a background image memory 1111 according to the flag "0". The operation of this decoding device differs from that of the first embodiment by the fact that a shape preparing portion 1102 prepares shape data according to single-bit data, contained in the input coded data, to specify whether each block is ineffective or effective.

The first and second embodiments may be modified so as to encode only a partial region of an input image in the first coding mode. This enables the coding device to encode, in case of encoding a part image containing only a speaking person region, his or her mouth area and the other area at different frame rates. This is realized by a coding device of FIG. 12 in which switch 206 of FIG. 2 is normally closed, and a decoding device of FIG. 13, in which the switch 307 of FIG. 3 is normally closed.

Figure 12:
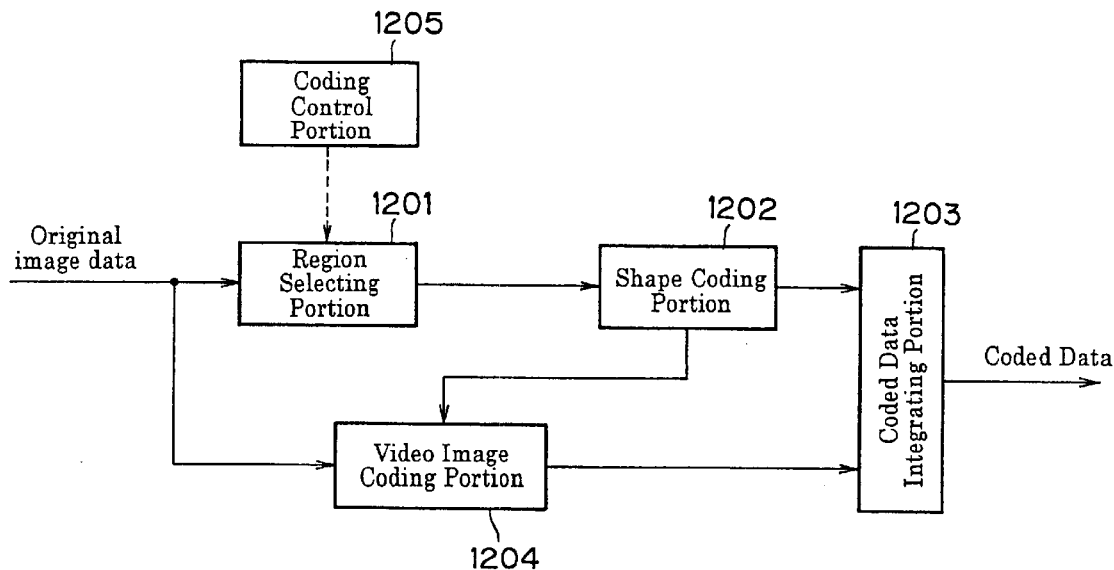
FIG. 12 is a block diagram of a video image coding device according to a fifth aspect of the present invention.

Even in the first coding mode, the coding device shown in FIG. 12 selects a partial region of an input image by a region selecting portion 1201, encodes only the selected region by a video coding portion 1204 and encodes the shape of the selected region by a shape coding portion 1202.

Figure 13:
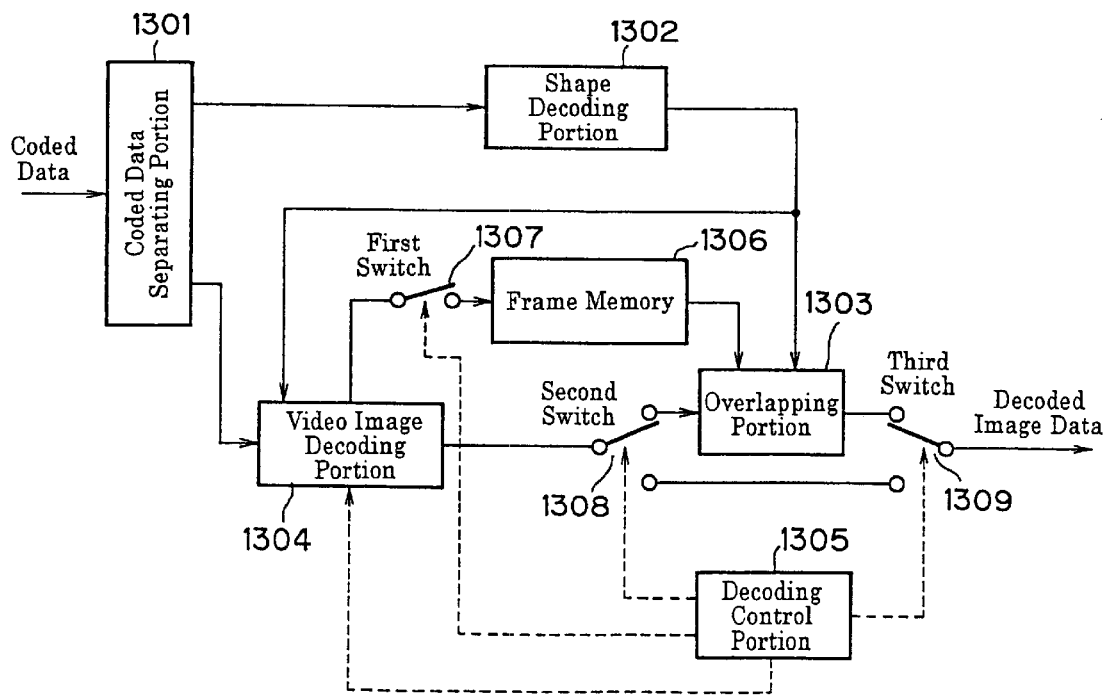
FIG. 13 is a block diagram of a video image decoding device according to a fifth aspect of the present invention.

The decoding device shown in FIG. 13, even in the first coding mode, decodes the region shape by a shape decoding portion 1302 and decodes a part of the coded image by a video image decoding portion 1304 according to the decoded shape. An overlapping portion 1303 overlaps a decoded partial area image (encoded in the second coding mode) of a part image with a decoded part image (encoded in the first coding mode).

Similarly, the second embodiment can also be modified to encode only a partial region within an image in the first coding mode. A coding device of FIG. 14 is realized by modifying the coding device of FIG. 4 to have the switch 406 being normally closed.

Figure 15:
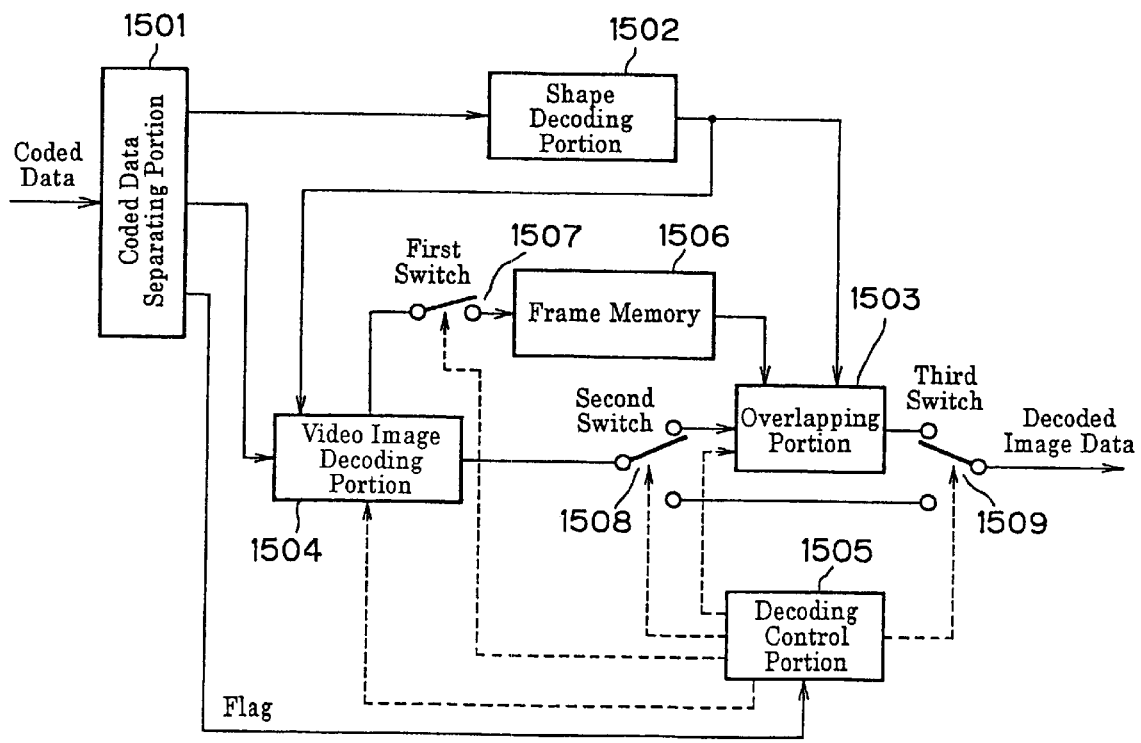
FIG. 15 is a block diagram of a video image decoding device according to a sixth aspect of the present invention.

A decoding device of FIG. 15 is realized by modifying the decoding device of FIG. 5 so that the first switch 507 is normally closed, the fifth switch 512 and the background image memory 511 are omitted and a control signal from the decoding control portion 505 to the fifth switch 512 is input to the overlapping portion 1503.

Figure 14:
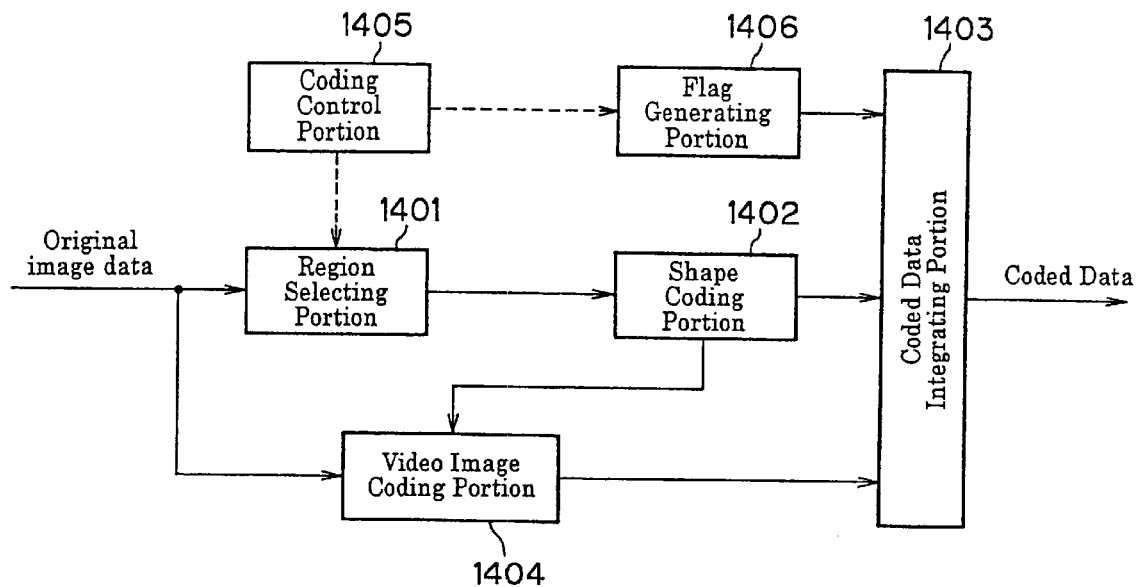
FIG. 14 is a block diagram of a video image coding device according to a sixth aspect of the present invention.

The coding device of FIG. 14, even in the first coding mode, selects a partial region of an input image by a region selecting portion 1401, encodes only the selected region by a video image coding portion 1404 and encodes the shape of the selected region by a shape coding portion 1402. Flags generated by a flag generating portion 1406 have different meaning from those used in the second embodiment as described below for the decoding device.

In the decoding device of FIG. 15, the overlapping portion 1503 operates in the following manner: With a flag having a value 1, decoded image data (coded in the second coding mode) is overlapped with image data in a frame memory 1506 as described before with reference to FIG. 5. With a flag having a value 0, the decoding device outputs decoded image data (coded in the second coding mode) directly without the above overlapping operation. Namely, a decoding control portion 1505 controls the overlapping portion 1503 to conduct the overlap of the image data with a flag having a value 1 and not to do the overlap if a flag has a value 0.

In both embodiments, a decoded image outputted from the decoding device is a decoded partial image (part image) of an input image. In practice, this image is overlapped with a suitable background image and displayed on a display (not shown).

In each of the above described coding devices according to the present invention, the coding control portion 205 controls an input of the video image coding portion 204 to the frame memory in case if the video image coding portion 204 uses the conventional technique shown in FIG. 1(A) and performs the unidirectional motion compensated prediction from the decoded image data that was decoded in the first coding mode. Namely, the decoded image data is recorded in the frame memory in the first coding mode and the decoded image data is not recorded in the frame memory in the second coding mode. This can reduce the quantity of the frame memories to one.

In the corresponding decoding device, the frame memory 306 is commonly used as a frame memory of the video image decoding portion 304. Namely, the decoded image data is recorded in the frame memory 306 in the first coding mode, which data is used for motion-compensated prediction of a subsequent image data. The decoded image data in the second coding mode may not be recorded in the frame memory since it cannot be used for motion-compensated prediction.

THE EFFECT OF THE INVENTION

The video coding and decoding devices according to the present invention can offer the following advantages:

(1) Since the coding device can encode an entire image in the first coding mode and a partial image of the image in the second coding mode, it can reduce a frame rate for the background image rather than a frame rate for the partial image. In other words, the image having a background containing a considerable motion can be suitably encoded without decreasing the frame rate for the partial image and without deterioration of the entire image quality.

(2) An image encoded in the second coding mode can be overlapped with an image encoded in the first coding mode or an image originally prepared by the decoding device. These two overlapping modes can be switched over to each other, enabling the user to use an originally prepared image as a background image.

(3) A coding device and decoding device can be so constructed that a partial image of the input image can be encoded in the second coding mode without encoding the shape of the partial region. The number of codes necessary for coding the shape data as well as the operations and memory capacity necessary for coding and decoding the shape data can be saved, thereby realizing simplicity of the implementing the present invention.

(4) In case of coding a partial region (part image) of an entire image in the first coding mode with coding the shape data of the region, it is also possible to encode a partial area of the part image at a different frame rate than the other area. This can improves the efficiency of encoding the part image.

What is claimed is:

1. A video image coding device having a first coding mode for encoding an image within a first region and a second coding mode for encoding an image within a second region being a partial region of the first region, which comprises:
   a region selecting portion for selecting the first region and the second region,
   a shape coding portion for encoding shapes of the first and second regions,
   a video image coding portion for encoding only values of pixels inside a selected region according to an output of the shape coding portion,
   a flag generating portion for generating overlapping information indicative of whether (a) a partial regional image data coded in the second coding mode is overlapped with a background image generated by an image coded in the first coding mode or (b) a partial regional image data coded in the second coding mode is overlapped with a background image generated by any method, and
   a coding data integrating portion for integrating the outputs of the shape coding portion, the video image coding portion and flag generating portion.

2. A video image coding device having a first coding mode for encoding an image within a first region covering an entire image and a second coding mode for encoding an image within a second region being a partial region of the first region, which comprises:
   a region selecting portion for selecting the second region,
   a shape coding portion for encoding a shape of the second region,
   a video image coding portion for encoding values of pixels of the entire image or only values of pixels inside the second region according to an output of the shape coding portion,
   a flag generating portion for generating overlapping information indicative of whether (a) a partial regional image data coded in the second coding mode is overlapped with a background image generated by an image coded in the first coding mode or (b) a partial regional image data coded in the second coding mode is overlapped with a background image generated by any method, and
   a coding data integrating portion for integrating the outputs of the shape coding portion, the video image coding portion and flag generating portion.

3. A video image decoding device having a first decoding mode for decoding an image within a first region and a second decoding mode for decoding an image within a second region being a partial region of the first region, which comprises:
   a coded data splitting portion for splitting input coded data into coded video image data, coded shape data derived from coding shapes of the first and/or second regions and overlapping information indicative of whether (a) a partial regional image data decoded in the second decoding mode is overlapped with a background image generated by an image decoded in the first decoding mode or (b) a partial regional image data decoded in the second decoding mode is overlapped with a background image generated by any method,
   a shape decoding portion for decoding the coded shape data,
   a video image decoding portion for decoding only values of pixels inside the first region in the first decoding mode and only values of pixels inside the second region in the second decoding mode, and
   an overlapping portion for overlapping an image decoded in the second decoding mode with the background image generated by the image decoded in the first decoding mode or said background image generated by any method based upon the overlapping information.

4. A video image decoding device having a first decoding mode for decoding a first region covering an entire image and a second decoding mode for decoding an image within a second region being a partial region of the first region, which comprises:
   a coded data splitting portion for splitting input coded data into coded video image data, coded shape data derived from coding a shape of the second region and overlapping information indicative of whether (a) a partial regional image data decoded in the second decoding mode is overlapped with the background image generated by an image decoded in the first decoding mode or (b) a partial regional image data decoded in the second decoding mode is overlapped with a background image generated by any method,
   a shape decoding portion for decoding the coded shape data,
   a video image decoding portion for decoding values of pixels of the entire image in the first decoding mode and only values of pixels inside the second region in the second decoding mode, and
   an overlapping portion for overlapping an image decoded in the second decoding mode with the background image generated by an image decoded in the first decoding mode or a background image generated by any method based upon the overlapping information.

* * * * *